(12) United States Patent
Sheridan

(10) Patent No.: US 9,878,796 B2
(45) Date of Patent: Jan. 30, 2018

(54) HYBRID DRIVE FOR GAS TURBINE ENGINE

(71) Applicant: United Technologies Corporation, Hartford, CT (US)

(72) Inventor: William G. Sheridan, Southington, CT (US)

(73) Assignee: United Technologies Corporation, Farmington, CT (US)

(*) Notice: Subject to any disclaimer, the term of this patent is extended or adjusted under 35 U.S.C. 154(b) by 416 days.

(21) Appl. No.: 14/620,259

(22) Filed: Feb. 12, 2015

(65) Prior Publication Data

US 2015/0274306 A1    Oct. 1, 2015

Related U.S. Application Data

(60) Provisional application No. 61/971,085, filed on Mar. 27, 2014.

(51) Int. Cl.

| F02C 3/04 | (2006.01) |
|---|---|
| B64D 27/24 | (2006.01) |
| F02C 7/36 | (2006.01) |
| B64D 35/02 | (2006.01) |
| B64D 35/04 | (2006.01) |
| F01D 15/12 | (2006.01) |

(Continued)

(52) U.S. Cl.
CPC ............ *B64D 27/24* (2013.01); *B64D 35/02* (2013.01); *B64D 35/04* (2013.01); *F01D 15/12* (2013.01); *F02C 7/36* (2013.01); *F02K 3/077* (2013.01); *B64D 2027/026* (2013.01); *F05D 2220/323* (2013.01); *F05D 2220/36* (2013.01); *F05D 2240/40* (2013.01); *F05D 2250/312* (2013.01); *F05D 2260/4023* (2013.01); *F05D 2260/4031* (2013.01); *Y02T 50/62* (2013.01); *Y10S 903/903* (2013.01)

(58) Field of Classification Search
USPC ......... 60/330, 340, 361, 362, 363, 341, 345, 60/346, 483, 484, 801, 802, 803, 805
See application file for complete search history.

(56) References Cited

U.S. PATENT DOCUMENTS

| 5,114,103 A * | 5/1992 | Coffinberry ............. B64C 21/06 244/118.5 |
|---|---|---|
| 7,540,450 B2 * | 6/2009 | Brand ..................... B64D 27/14 244/54 |
| 2006/0011780 A1 | 1/2006 | Brand et al. |

(Continued)

FOREIGN PATENT DOCUMENTS

EP    2226487 A2    9/2010

OTHER PUBLICATIONS

Hybrid Help, article, Aviation Week & Space Technology, Jan. 27, 2014.

(Continued)

*Primary Examiner* — Binh Q Tran
(74) *Attorney, Agent, or Firm* — Carlson, Gaskey & Olds, PC

(57) ABSTRACT

A gas turbine engine has a fan drive turbine for selectively driving a fan rotor. A drive shaft between the fan drive turbine and the fan rotor includes a clutch, and an electric motor. The electric motor is positioned such that it is not downstream of a flow path relative to the fan drive turbine. A method of operating a gas turbine engine is also disclosed.

22 Claims, 2 Drawing Sheets

(51) Int. Cl.
*F02K 3/077* (2006.01)
*B64D 27/02* (2006.01)

(56) References Cited

U.S. PATENT DOCUMENTS

| | | | | |
|---|---|---|---|---|
| 2009/0056309 A1* | 3/2009 | Roberge | ............... | F02C 3/113 60/263 |
| 2009/0289456 A1* | 11/2009 | McLoughlin | ........... | F01D 15/10 290/46 |
| 2009/0293494 A1 | 12/2009 | Hoffjann et al. | | |
| 2010/0000226 A1* | 1/2010 | Rensch | ............... | F01D 15/10 60/784 |
| 2010/0219779 A1* | 9/2010 | Bradbrook | .............. | F02C 3/113 318/153 |
| 2013/0134264 A1 | 5/2013 | Carter et al. | | |
| 2016/0097328 A1* | 4/2016 | Wintgens | ................. | F02C 7/32 415/1 |

OTHER PUBLICATIONS

European Search Report for European Application No. 15160776.9 dated Sep. 5, 2015.

* cited by examiner

HYBRID DRIVE FOR GAS TURBINE ENGINE

CROSS-REFERENCE TO RELATED APPLICATION

This application claims priority to U.S. Provisional Patent Application No. 61/971,086, filed Mar. 27, 2014.

BACKGROUND

This application relates to a gas turbine engine, wherein an electric motor may selectively drive a fan rotor at low power conditions of an associated aircraft.

Gas turbine engines are known and are often mounted on aircraft. In a known gas turbine engine, a fan delivers air into a core engine, and into a bypass housing as propulsion air. The air in the core housing passes to a compressor where it is compressed, and then delivered into a combustion section. The air is mixed with fuel in the combustion section and ignited. Products of this combustion pass downstream over a turbine rotor, driving the turbine rotor to rotate, and in turn drive the compressor and fan rotors.

In standard gas turbine engines, the engine is maintained operating throughout the entire flight of the associated aircraft. As known, the engine has high power conditions at take-off, and landing. the gas turbine engine would otherwise be shut down, saving fuel.

However, while the aircraft is in the air at cruise conditions, the power requirements are much lower. Thus, maintaining the engine operating throughout the entire flight results in an unnecessarily large amount of fuel consumed.

Recently it has been proposed to incorporate an electric motor to selectively drive the fan rotor, and in particular at cruise conditions. However, the proposed system has positioned the electric motor in the path of exhaust gas, and downstream of the turbine rotor. This is a very high temperature location, and results in challenges to maintaining the electric motor, and associated wires, etc., operational.

SUMMARY OF THE INVENTION

In a featured embodiment, a gas turbine engine has a fan drive turbine for selectively driving a fan rotor. A drive shaft between the fan drive turbine and the fan rotor includes a clutch, and an electric motor. The electric motor is positioned such that it is not downstream of a flow path relative to the fan drive turbine.

In another embodiment according to the previous embodiment, the fan drive turbine drives a shaft extending through a core engine duct delivering air into a compressor rotor. The shaft drives a bevel gear to in turn drive the fan rotor.

In another embodiment according to any of the previous embodiments, the electric motor is positioned radially outwardly of the core engine duct.

In another embodiment according to any of the previous embodiments, the clutch is also positioned radially outwardly of the core engine duct.

In another embodiment according to any of the previous embodiments, the fan drive turbine rotor also drives a compressor rotor.

In another embodiment according to any of the previous embodiments, there are three turbine rotors. An upstream and intermediate turbine rotor each drive a compressor rotor. A downstream of the three turbine rotors is the fan drive turbine.

In another embodiment according to any of the previous embodiments, a control may open the clutch when an associated aircraft is at cruise altitude.

In another embodiment according to any of the previous embodiments, the motor is operated when the associated aircraft is at cruise altitude.

In another embodiment according to any of the previous embodiments, an axially outer location of the gas turbine engine is defined as the location of the fan rotor. The electric motor is positioned axially intermediate the fan rotor and the combustor.

In another embodiment according to any of the previous embodiments, the clutch is closed at least when the associated aircraft is at take-off conditions.

In another featured embodiment, a method of operating a gas turbine engine comprises ng the steps of driving a turbine rotor through a clutch to drive an associated fan rotor, and providing an electric motor for selectively driving the fan motor, driving the fan rotor with the clutch closed by the gas turbine engine when an associated aircraft is at a relatively high power condition, and opening the clutch, stopping operation of the gas turbine engine, and driving the fan rotor through the electric motor when the associated aircraft is at a low power condition. The electric motor is positioned such that it is not downstream of a flow path for products of combustion having passed downstream of a fan drive turbine rotor, that is driving the fan rotor.

In another embodiment according to the previous embodiment, the fan drive turbine drives a shaft extending through a core engine duct delivering air into a compressor rotor. The shaft drives a bevel gear to in turn drive the fan rotor.

In another embodiment according to any of the previous embodiments, the electric motor is positioned radially outwardly of the core engine duct.

In another embodiment according to any of the previous embodiments, the clutch is also positioned radially outwardly of the core engine duct.

In another embodiment according to any of the previous embodiments, the fan drive turbine rotor also drives a compressor rotor.

In another embodiment according to any of the previous embodiments, there are three turbine rotors. An upstream and intermediate turbine rotor each drive the compressor rotor, and a downstream of the three turbine rotors is the fan drive turbine rotor In another embodiment according to any of the previous embodiments, the clutch is opened when an associated aircraft is at cruise altitude.

In another embodiment according to any of the previous embodiments, the motor is operated when the associated aircraft is at cruise altitude.

In another embodiment according to any of the previous embodiments, an axially outer location of the gas turbine engine is defined as the location of the fan rotor. The electric motor is positioned axially intermediate the fan rotor and the combustor.

In another embodiment according to any of the previous embodiments, the clutch is closed at least when the associated aircraft is at take-off conditions.

These and other features of this application may be better understood from the following specification and drawings, the following of which is a brief description.

DETAILED DESCRIPTION

Figure 1A:
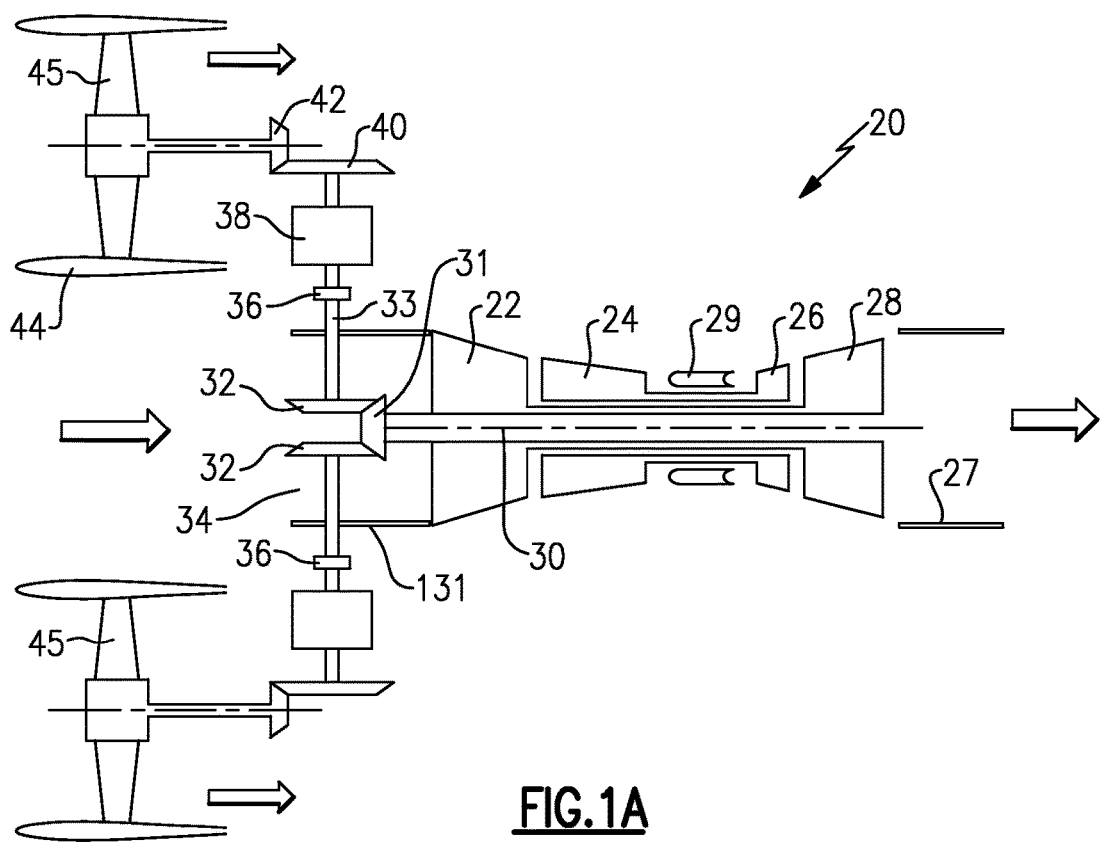
FIG. 1A schematically shows a gas turbine engine.

An engine 20 is illustrated in FIG. 1A having an upstream or low pressure compressor rotor 22, and a downstream or high pressure compressor rotor 24.

A high pressure or upstream turbine rotor 26 drives compressor rotor 24. A downstream or low pressure turbine rotor 28 drives the compressor rotor 22. A combustion section 29 is positioned intermediate compressor rotor 24 and turbine rotor 26. As known, air is received from a core inlet 34, compressed across compressor rotors 22 and 24. That air is delivered into the combustion section 29 where it is mixed with fuel and ignited.

Products of this combustion pass downstream over turbine rotors 26 and 28, driving them to rotate. The product of this combustion then passes through an exhaust duct 27. As can be appreciated, products of the combustion in the exhaust duct 27 are very hot.

A shaft 30 is also driven by the downstream turbine rotor 28, and includes a gear 31 that drives bevel gears 32 to in turn drive a shaft 33 through a clutch 36. An electric motor 38 is positioned between the clutch 36 and a gear 40. Gear 40 engages a gear 42 to drive the fan rotor 45. Fan rotor 45 is driven within a bypass duct 44. In the illustrated embodiment, there are plural fan rotors driven by the shaft 30.

Figure 1B:
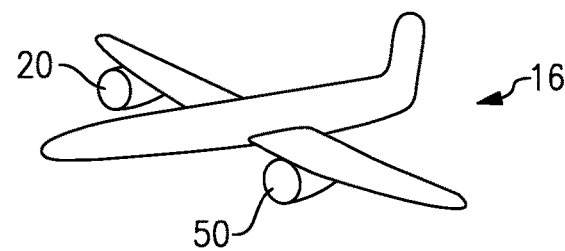
FIG. 1B shows an aircraft.
Figure 2:
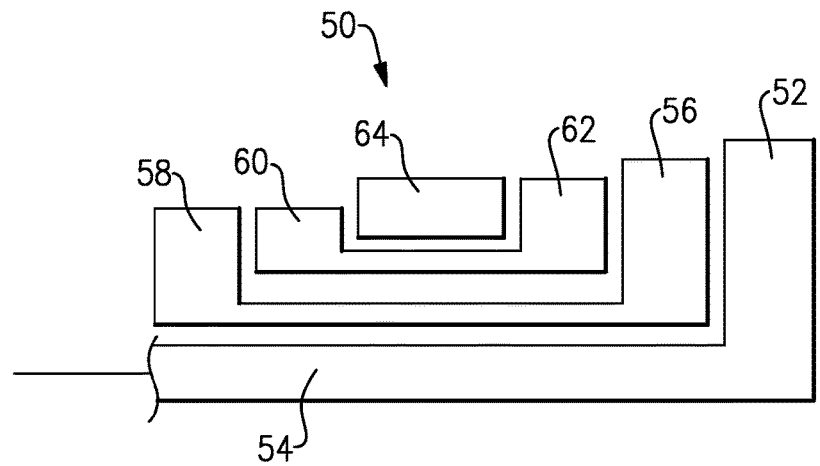
FIG. 2 shows a second embodiment.

As shown in FIG. 2, in another embodiment engine 50, there may be a compressor rotors 58 and 60 driven by turbine rotors 62 and 56, similar to the FIG. 1 embodiment. Again, a combustion section 64 provides products of combustion to drive the turbine rotors 62 and 56. However, in this embodiment, a third turbine rotor 52 drives a shaft 54 to in turn drive the fan rotors, such as fan rotor 45 as shown in FIG. 1A. That is, shaft 54 drives a gear arrangement as shown in FIG. 1A.

As shown in FIG. 1B, an associated aircraft 16 may mount two engines, that may be either like engine 20 or 50. Of course, other numbers of engines may be used. While the engine inlet and exhaust are not illustrated in FIG. 1B, such would be along the airframe fuselage.

Figure 3:
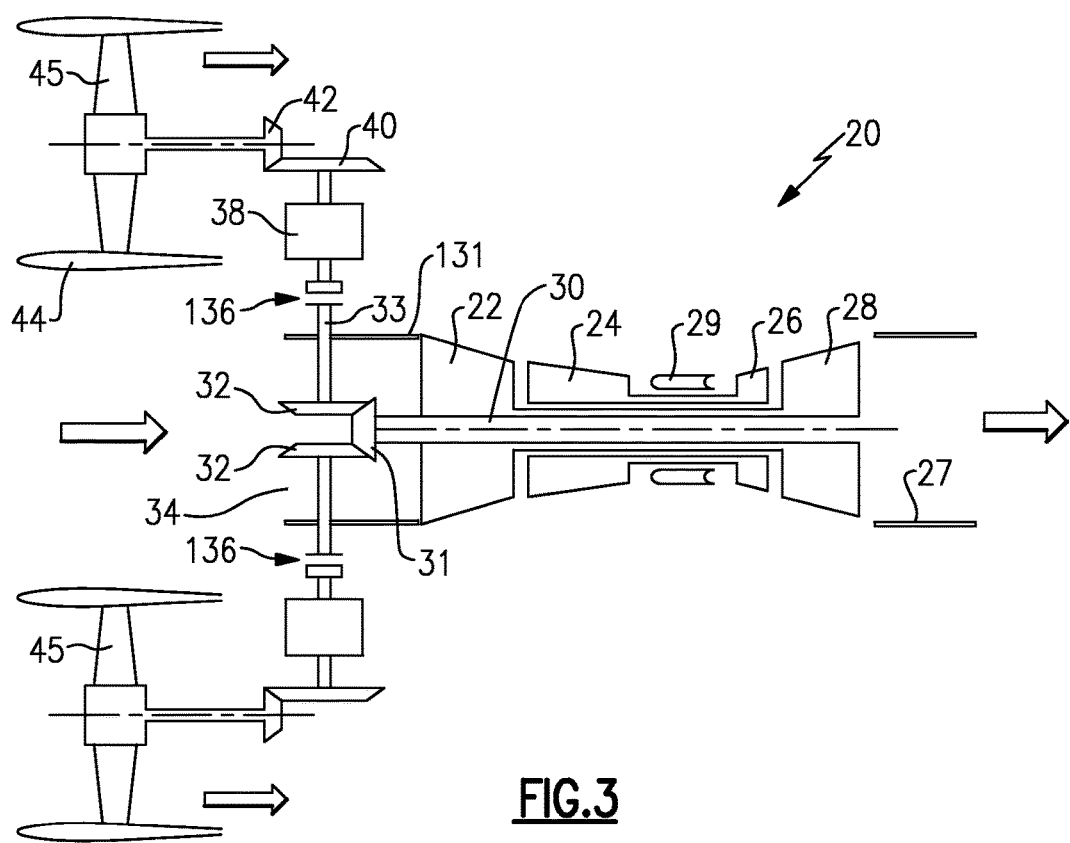
FIG. 3 shows the FIG. 1A engine in a low power operational mode.

FIG. 3 shows a low pressure condition for the FIG. 1A engine. It should be understood that a similar operational strategy can be utilized with a FIG. 2 type engine.

In addition, it should be understood that the gears 31 and 32 (or 40 and 42) may provide a gear reduction, such that the fan rotor 45 rotates at a slower speed than the compressor rotor 22, or the turbine rotor 28.

During high power conditions of an associated aircraft, the engine 20 (or 50) is operated, such that combustion occurs in the combustion section, and the turbine rotors 26 and 28 (or 62/56/52) are driven. However, once the associated aircraft 16 reaches a cruise condition, the required power is relatively low. Under such conditions the clutch 36 may be opened as shown at 136 in FIG. 3. At this point, the electric motor 38 is operated to drive the fan rotors 45. Under such conditions, only the bypass propulsion air provided by the fan rotors 45 will be driving the aircraft 16.

Once the aircraft 16 approaches landing conditions, the engine 20 (or 50) may be restarted, the clutch 36 closed, and the motor 38 stopped.

Of course, the motor 38 could also supplement power to the fan while the engine is running. It should be understood that the motor is constructed such that it passes rotation to gear 40 from shaft 30 even when motor 38 is shut down.

However, by positioning the motor 38, and clutch 36, in a relatively low temperature location, the conditions that must be survived by these components are simplified compared to the proposed electric motor positioned in the path of hot products of combustion as in the prior art.

As can be appreciated from FIG. 1A and FIG. 3, one way of defining the location for motor 38 would be to say it is upstream of combustor 29, or axially outward of the combustor 29, with an axially forward position being defined by the location of the fan rotors 45. Another way of defining the location of the motors 38 is to say that they are positioned radially outward, defined by an axis of rotation of shaft 30, relative to a core engine housing 131. Another way of defining the location would be to say that the motor is not located in the path of the products of combustion. Stated another way, the electric motor 38 is positioned such that it is not downstream of a flow path relative to the fan driving turbine rotors 28 or 52.

An axially outer location of the gas turbine engine is defined as the location of the fan rotor. The electric motor is positioned axially intermediate the fan rotor and the combustor.

As can be appreciated, an appropriate motor controller, which may otherwise function as a full authority digital electronic controller (FADEC) may control the operation of the core engine and the fan. A worker of ordinary skill in the art would recognize how to provide such an appropriate control.

Thus, the system is much more easily maintained and operated than the proposed prior art system.

Although embodiments have been disclosed, a worker of ordinary skill in this art would recognize that certain modifications would come within the scope of this invention. For that reason the following claims should be studied to determine the true scope and content of this invention.

The invention claimed is:

1. A gas turbine engine comprising:
    a fan drive turbine for selectively driving a fan rotor;
    a drive shaft between said fan drive turbine and said fan rotor including a clutch, and an electric motor; and
    said electric motor being positioned such that it is not downstream of a flow path relative to said fan drive turbine, said electric motor and said drive shaft of said fan drive turbine driving said fan rotor through a common shaft.

2. The gas turbine engine as set forth in claim 1, wherein said fan drive turbine drives a shaft extending through a core engine duct delivering air into a compressor rotor, and said shaft driving a bevel gear to in turn drive said fan rotor.

3. The gas turbine engine set forth in claim 2, wherein said electric motor is positioned radially outwardly of said core engine duct.

4. The gas turbine engine as set forth in claim 3, wherein said clutch is also positioned radially outwardly of said core engine duct.

5. The gas turbine engine as set forth in claim 1, wherein said fan drive turbine rotor also driving a compressor rotor.

6. The gas turbine engine as set forth in claim 1, wherein there are three turbine rotors, wherein an upstream and intermediate turbine rotor each drive a compressor rotor, and a downstream of said three turbine rotors being said fan drive turbine.

7. The gas turbine engine as set forth in claim 1, wherein a control may open said clutch when an associated aircraft is at cruise altitude.

8. The gas turbine engine as set forth in claim 1, wherein said motor is operated when the associated aircraft is at cruise altitude.

9. The gas turbine engine as set forth in claim 1, wherein an axially outer location of said gas turbine engine is defined as the location of said fan rotor, and said electric motor being positioned axially intermediate said fan rotor and said combustor.

10. The gas turbine engine as set forth in claim 7, wherein said clutch is closed at least when the associated aircraft is at take-off conditions.

11. A method of operating a gas turbine engine comprising the steps of:
 driving a turbine rotor through a clutch to drive an associated fan rotor, and providing an electric motor for selectively driving said fan motor;
 driving said fan rotor with said clutch closed by said gas turbine engine when an associated aircraft is at a relatively high power condition; and
 opening said clutch, stopping operation of said gas turbine engine, and driving said fan rotor through said electric motor when the associated aircraft is at a low power condition, and further including the step of positioning said electric motor such that it is not downstream of a flow path for products of combustion having passed downstream of a fan drive turbine rotor, that is driving said fan rotor, said electric motor and said drive shaft of said fan drive turbine driving said fan rotor through a common shaft.

12. The method as set forth in claim 11, wherein said fan drive turbine driving a shaft extending through a core engine duct delivering air into a compressor rotor, and said shaft driving a bevel gear to in turn drive said fan rotor.

13. The method set forth in claim 12, wherein said electric motor is positioned radially outwardly of said core engine duct.

14. The method as set forth in claim 13, wherein said clutch is also positioned radially outwardly of said core engine duct.

15. The method as set forth in claim 11, wherein the fan drive turbine rotor also driving a compressor rotor.

16. The method as set forth in claim 11, wherein there are three turbine rotors, wherein an upstream and intermediate turbine rotor each drive the compressor rotor, and a downstream of said three turbine rotors being said fan drive turbine rotor.

17. The method as set forth in claim 11, wherein said clutch is opened when an associated aircraft is at cruise altitude.

18. The method as set forth in claim 11, wherein said motor is operated when the associated aircraft is at cruise altitude.

19. The method as set forth in claim 11, wherein an axially outer location of said gas turbine engine is defined as the location of said fan rotor, and said electric motor being positioned axially intermediate said fan rotor and said combustor.

20. The method as set forth in claim 17, wherein said clutch is closed at least when the associated aircraft is at take-off conditions.

21. The gas turbine engine as set forth in claim 1, wherein there are a plurality of fan rotors, and said fan drive turbine driving said plurality of fan rotors through a plurality of clutches, and each of said fan rotors being provided with an electric motor.

22. The gas turbine engine as set forth in claim 1, wherein said drive shaft of said fan drive turbine driving a gear which is turn drives the gear associated with the second drive shaft, said clutch being positioned on said second drive shaft, and said second drive shaft driving another gear which in turn drives a gear to drive a shaft associated with said fan rotor, and said electric motor being positioned on said second drive shaft.

* * * * *